April 26, 1932.   J. A. DORNER   1,855,793
TRIMMING MACHINE
Filed April 13, 1929   2 Sheets-Sheet 1
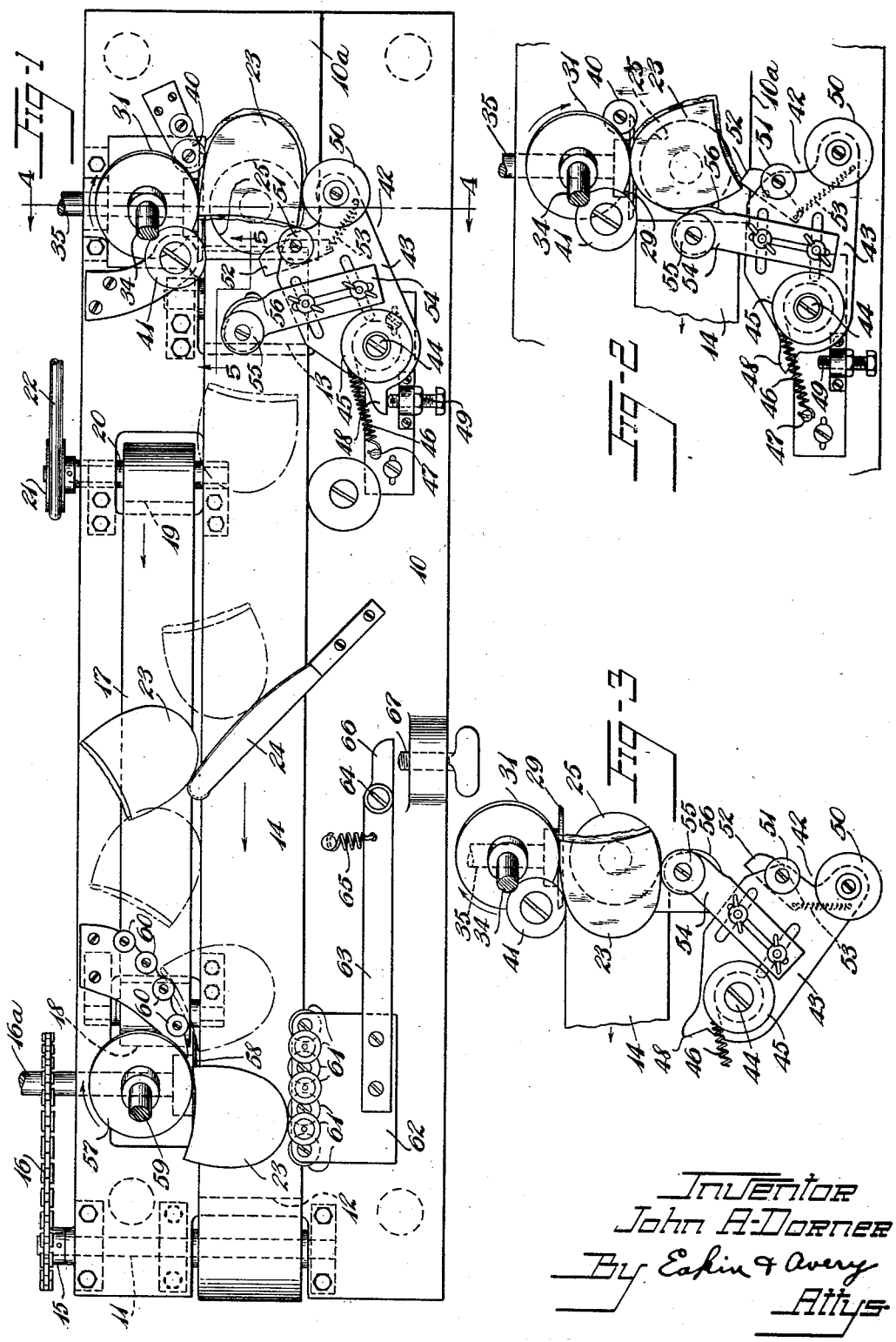
Inventor
John A. Dorner
By Eakin & Avery
Attys

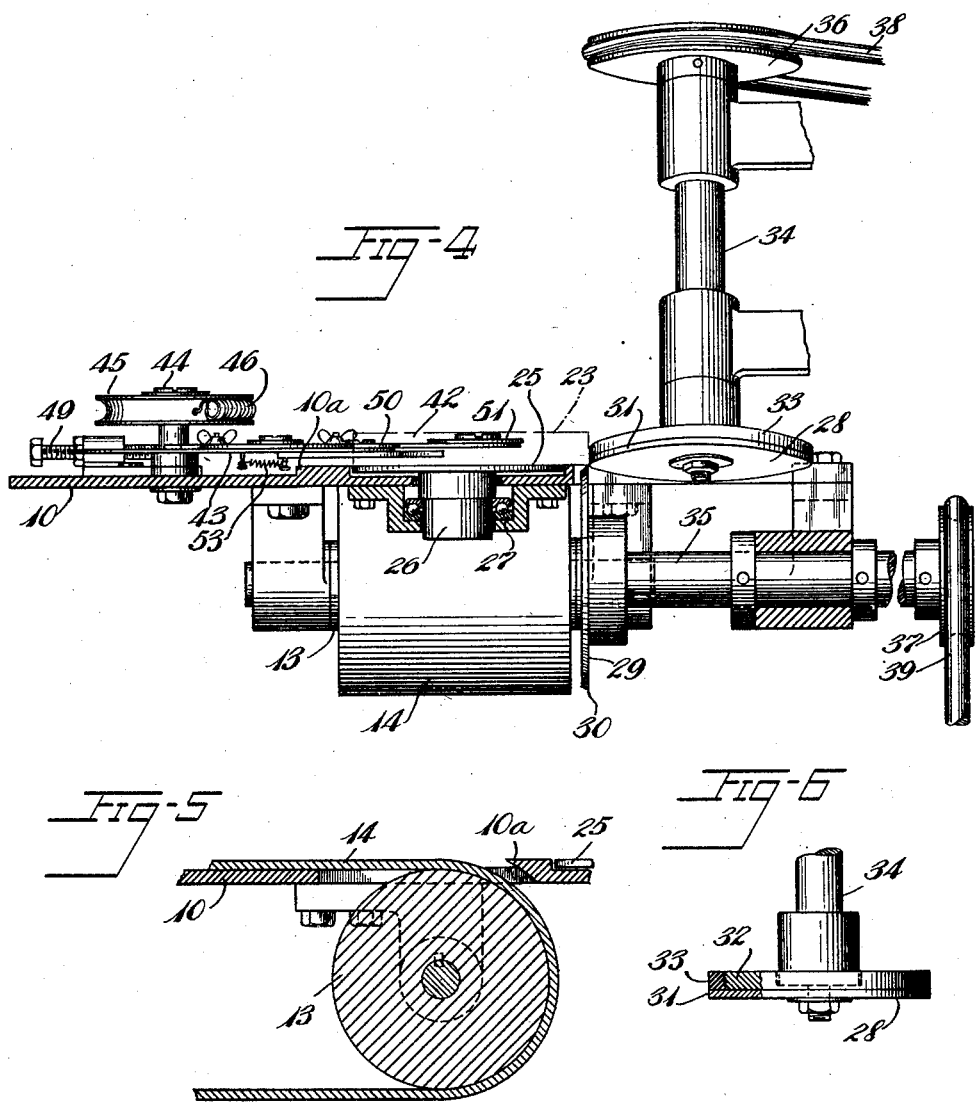

Patented Apr. 26, 1932

1,855,793

UNITED STATES PATENT OFFICE

JOHN A. DORNER, OF AKRON, OHIO, ASSIGNOR TO THE B. F. GOODRICH COMPANY, OF NEW YORK, N. Y., A CORPORATION OF NEW YORK

TRIMMING MACHINE

Application filed April 13, 1929. Serial No. 354,784.

This invention relates to trimming machines, and more especially to automatic mechanism for severing the overflow fins or rands from rubber heels. The invention is an improvement upon a heel trimming machine of known construction, and resides in improved cutting and feeding mechanism.

The chief objects of the invention are to effect more expeditiously the trimming of rubber heels or the like; to improve the appearance of the finished product; and to provide improved apparatus for accomplishing the foregoing objects.

Of the accompanying drawings:

Fig. 1 is a plan view of a machine embodying my invention in its preferred form, and work therein, my improved mechanism being shown in the initial stage of trimming the convex portion of a heel.

Fig. 2 is a fragmentary plan view showing the apparatus at an intermediate stage of the initial trimming operation.

Fig. 3 is a view similar to Fig. 2 at the final stage of the initial trimming operation.

Fig. 4 is a section on line 4—4 of Fig. 1.

Fig. 5 is a section on line 5—5 of Fig. 1.

Fig. 6 is a detail elevation of one member of a rotary cutter, a part thereof being in section.

Referring to the drawings, 10 is an elevated support or table at one end of which is journaled a drive-shaft 11 upon which is mounted a belt-pulley 12 and a similar pulley 13 is journaled adjacent the opposite end of the table 10 and connected with the pulley 12 by a belt-conveyor 14, the upper reach of which is supported by the top of the table. The drive-shaft 11 is provided with a sprocket 15 driven by a sprocket chain 16 from a shaft 16ª which is connected with a suitable source of power (not shown). A similar, somewhat shorter belt-conveyor 17 is positioned adjacent and parallel to the conveyor 14 at one side of the latter and intermediate its ends, the conveyor 17 being mounted upon belt pulleys 18, 19 of which the pulley 18 is suitably journaled beneath the table 10 and the pulley 19 is mounted upon a drive-shaft 20 journaled beneath said table and provided with a drive pulley 21 connected by a driving belt 22 with a suitable source of power (not shown). The upper faces of the belt conveyors 14, 17 are disposed in the same horizontal plane and the conveyors are driven in the same direction at the same surface speed.

The work-receiving end of the machine is at the right as it is viewed in Fig. 1, and adjacent the end of the belt conveyor 14 thereat is heel trimming mechanism embodying my invention, adapted to sever the overflow rand from the convex marginal portions of molded rubber heels 23, 23 which are manually introduced into the machine at this point. The conveyor 14 receives the heels at the conclusion of the initial trimming operation and and carries them toward the delivery end of the machine, and an obliquely disposed deflector 24 extends transversely of the conveyor 14 for deflecting the heels onto the conveyor 17. At the delivery end of the latter is trimming mechanism for removing the overflow rand from the concave breast portion of the heels as the heels are once more deflected, onto the conveyor 14, and the latter delivers the completely trimmed heels at the left end of the machine.

The initial rand-trimming operation which removes the overflow from the convex portion of the perimeter of a heel starts at one corner of the heel and progresses to the other corner thereof. A rotary cutter is so positioned that it initially engages a corner of the heel when the heel is manually inserted, breast foremost, into the machine, and the friction of said cutter upon the heel imparts thereto a rotary movement, in its own plane, with the result that the convex perimeter of the heel is progressively presented to the cutter. Said rotary movement of the heel 23 is facilitated by a turntable 25 mounted upon a spindle 26 journaled in a suitable bearing 27 beneath the table 10, the turntable being positioned immediately anterior to the conveyor 14, and has its top face flush with the surface of a raised portion 10ª on the table 10, the top of said raised portion being flush with the top face of said conveyor. The heels 23 rest upon the turntable 25 during the initial trimming operation.

The cutter which severs the overflow rand in the initial trimming operation comprises two rotatable cutting members 28, 29 having circular cutting edges 30, 31 respectively disposed in different non-parallel planes, the intersection of which forms a chord on the cutting edge 30, the latter preferably being slightly beveled as shown and the cutting edge 31 being substantially cylindrical. Backing the cutting member 28 is a plate 32, of somewhat smaller diameter than the member 28, and having its perimeter overlaid with a cushion 33 of resilient material such as rubber, the outer periphery of the cushion 33 being flush with the cylindrical cutting edge 31 of the member 28. The rotatable members 28, 32 are mounted upon a shaft 34 and the member 29 is mounted upon a shaft 35, the axes of said shafts being so disposed as not to intersect each other. The shafts 34, 35 are provided with respective belt pulleys 36, 37 and driven at the same speed from a common source of power (not shown) by driving belts 38, 39.

Positioned at each side of the cutter, above the table 10, are guide-rollers 40, 41 for facilitating the insertion of the heels 23 into engagement with the cutter, and their departure therefrom in proper position. On the opposite side of the turntable 25 and conveyor 14 from the cutter is mounted a mechanism generally designated 42 for yieldingly urging the heels into operative engagement with the cutter, and for co-operation with the guide roller 41 in guiding the heels off the turntable 25 onto the conveyor 14.

The mechanism 42 comprises a supporting arm 43 pivotally mounted adjacent one of its ends at 44 and provided thereat with a coaxial, peripherally grooved pulley 45 which is mounted in fixed relation to the arm 43 and serves as a lever. A tension spring 46 is mounted in part of said groove and has one of its ends secured thereto, and the other end of the spring is secured to a stud 47 rising from the table 10, the arrangement being such that the free end of the arm 43 is normally urged toward the turntable 25. The arm 43 is formed with a rearwardly projecting lug 48 adapted to engage an adjustable stop 49 for limiting the pivotal movement of the arm toward said turntable and for defining the normal inoperative position of the arm.

Pivotally mounted upon the marginal portion of the arm 43 at the free end thereof is a pair of guide-rollers or discs 50, 51 so positioned as successively to engage the margin of a heel 23 as the latter is rotated upon the turntable 25, as is clearly shown in Figs. 1 and 2. A finger 52 is pivotally mounted upon the arm 43 adjacent the disc 51, one end of said finger projecting beyond the margin of the arm to engage the breast portion of the heel as the latter rotates, as is clearly shown in Fig. 2, and the other end of the finger being attached to one end of a tension spring 53, the other end of which is secured to the plate 48, the arrangement permitting the finger 52 easily to retract and disengage itself from the heel 23 without scraping the heel or sliding upon it.

A plate or bracket 54 is adjustably mounted upon the arm 43 for adjustment in two directions, and a guide-roller or disc 55 is journaled on the outer end of said bracket in position lastly to engage the heel 23 as the cutter completes the trimming of the convex portion of the heel as is shown in Fig. 3. In order that the heel 23 by its rotary movement may swing the arm 43, against the tension of the spring 46, to bring the disc 55 into engagement with the heel, the bracket 54 is so formed that the heel engages an arcuate edge of the bracket before engaging the disc 55, and said arcuate edge is provided with a layer 56 of resilient friction material such as rubber for effecting such frictional engagement with the rotating heel 23 as to move the arm 43 angularly whereby the disc 55 is brought into engagement with the heel.

At the completion of the trimming operation on the convex margin of the heel, the latter is disposed in the position shown in Fig. 3, with its breast portion reversed with relation to its original position, the opposite convex side of the heel extending well onto the conveyor 14, and the arm 43 so disposed as not to obstruct the heel. The arrangement permits the conveyor to withdraw the heel from the turntable 25 and the spring 46 to restore the arm 43 to its normal inoperative position.

Mounted at the delivery end of the conveyor 17 is a cutter for removing the overflow rand of rubber from the breast of rubber heels, said cutter comprising two rotatable cutting members 57, 58 similar to the cutting members 28, 29 but not including members analogous to the plate 32 and cushion 33 associated with the latter. The member 58 is mounted upon the shaft 16ª and the member 57 is mounted upon a shaft 59 driven by suitable driving means at the same speed as the shaft 16ª. The members 57, 58 intersect each other close to the conveyor 14 and an arcuate series of guide rollers 60, 60 is positioned above the conveyor 17 for intercepting the heels 23 thereon and for guiding them in an arcuate course, parallel to the arcuate margin of their breast portions, into engagement with the cutter members 57, 58 wherein the overflow rand is progressively severed from said breast portions.

For yieldingly urging the heels 23 into operative association with the cutting members 57, 58 I provide an aligned series of presser rollers or discs 61, 61 journaled on a suitable support 62 mounted upon the end of a lever-arm 63, the latter being pivoted at 64 on the table 10 and connected to a tension spring 65 which urges the arm 63 and discs 61 toward the conveyor 14 so that said discs yieldingly engage successive heels 23 and hold them in operative engagement with the cutter as they are trimmed thereby. The lever-arm 63 is formed on the opposite side of its pivot 64 with an extension 66 adapted to abut an adjustable stop 67 for defining the normal inoperative position of the lever-arm.

The operation of the machine will be apparent from the foregoing description of the apparatus. The heels are manually fed into the machine at the work-receiving end thereof and thereafter are automatically completely trimmed and delivered from the opposite end of the machine.

My invention may be modified within the scope of the appended claims, and I do not limit my claims wholly to the specific construction shown and described.

I claim:

1. In a trimming machine, the combination of a rotary cutter adapted to trim the margin of an article and frictionally feed the said margin past the trimming position and thus to rotate the article, a support for the article to be trimmed and yielding means for urging the article toward the cutter, said yielding means comprising a work engaging roller and a pivoted arm constituting a mounting therefor and having a work-engaging portion composed of yielding, frictional material adapted to be frictionally driven by the work to vary the position of the yielding means in relation to the cutter and thus to position the said roller for coaction with the work.

2. A trimming machine as defined in claim 1 in which that portion of the pivoted arm which is provided with frictional material is adjustably mounted with relation to the rest of the arm.

3. In a trimming machine, the combination of a rotary cutter adapted to trim the margin of an article of irregular contour and to advance the article, a support for the article, a yieldingly mounted arm for urging the article toward the cutter, and work-engaging finger pivoted on said arm and yieldingly urged toward such a position as to engage a corner of the article and to be rotated on its pivot by the article to such a position as to assist the cutter in advancing the article.

4. A trimming machine as defined in claim 3 including an adjustably mounted bracket on the work-engaging arm and a work-engaging cushion of rubber on said bracket.

5. A machine for trimming articles having a non-circular periphery, said machine comprising a pair of rotary cutting members whose axes are angularly disposed to each other, one of the members being adapted to abut the periphery of the article to position the same, means carried by said abutting member and concentric therewith for engaging the article and supplementing the normal pulling action of the cutters and a support for said article.

6. A machine for trimming articles having a non-circular periphery, said machine comprising a pair of rotary cutters whose axes are angularly disposed to each other, one of the members being adapted to abut the periphery of the article to position the same, a rubber cushion carried by said abutting member and concentric therewith for supplementing the normal pulling action of the cutters, and yielding means for effecting a compound rotary and linear movement of the work past the cutter.

In witness whereof I have hereunto set my hand this 9th day of April, 1929.

JOHN A. DORNER.